Apr. 17, 1923.
E. KELBER
WINDSHIELD CLEANER
Filed Mar. 2, 1922
1,451,698
2 sheets-sheet 1
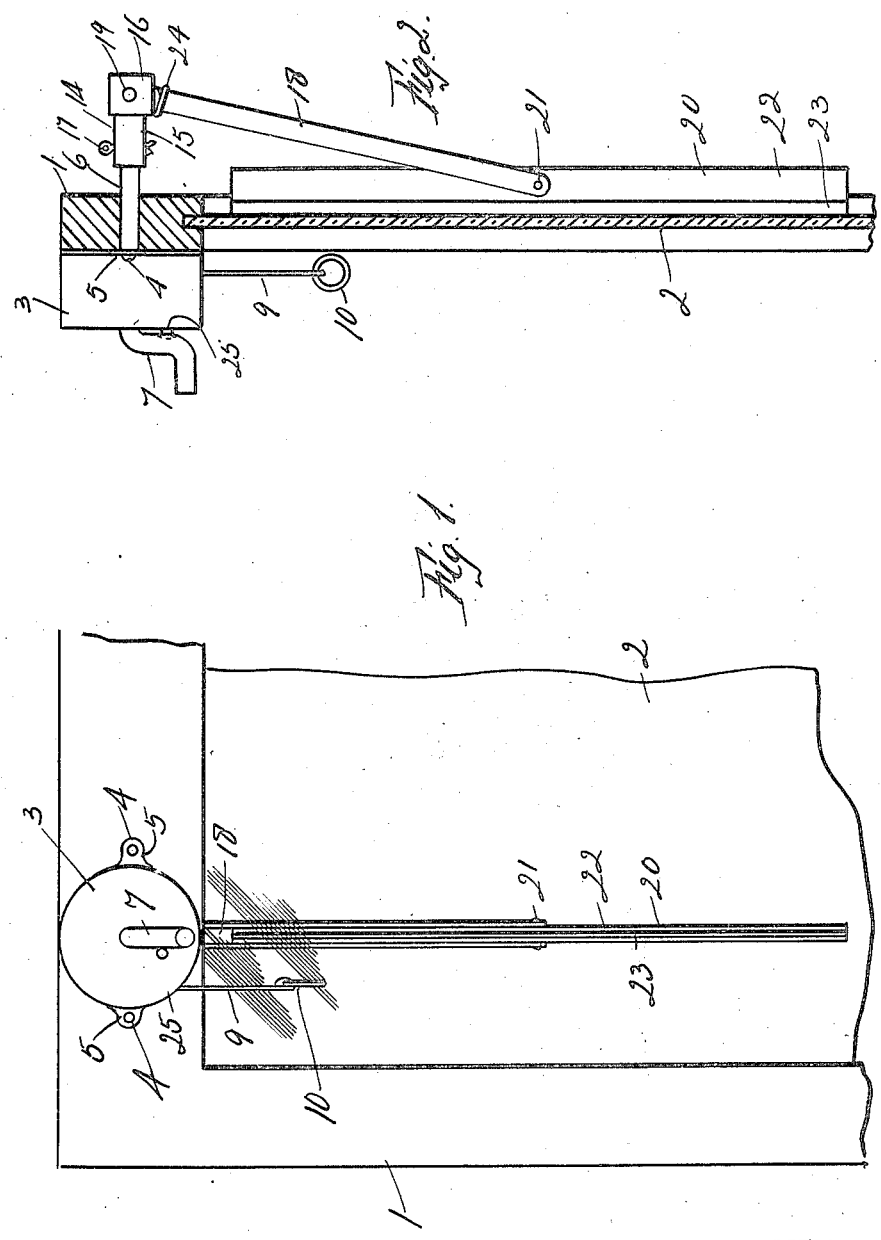
INVENTOR
Edward Kelber
By W. W. Williamson
Atty.

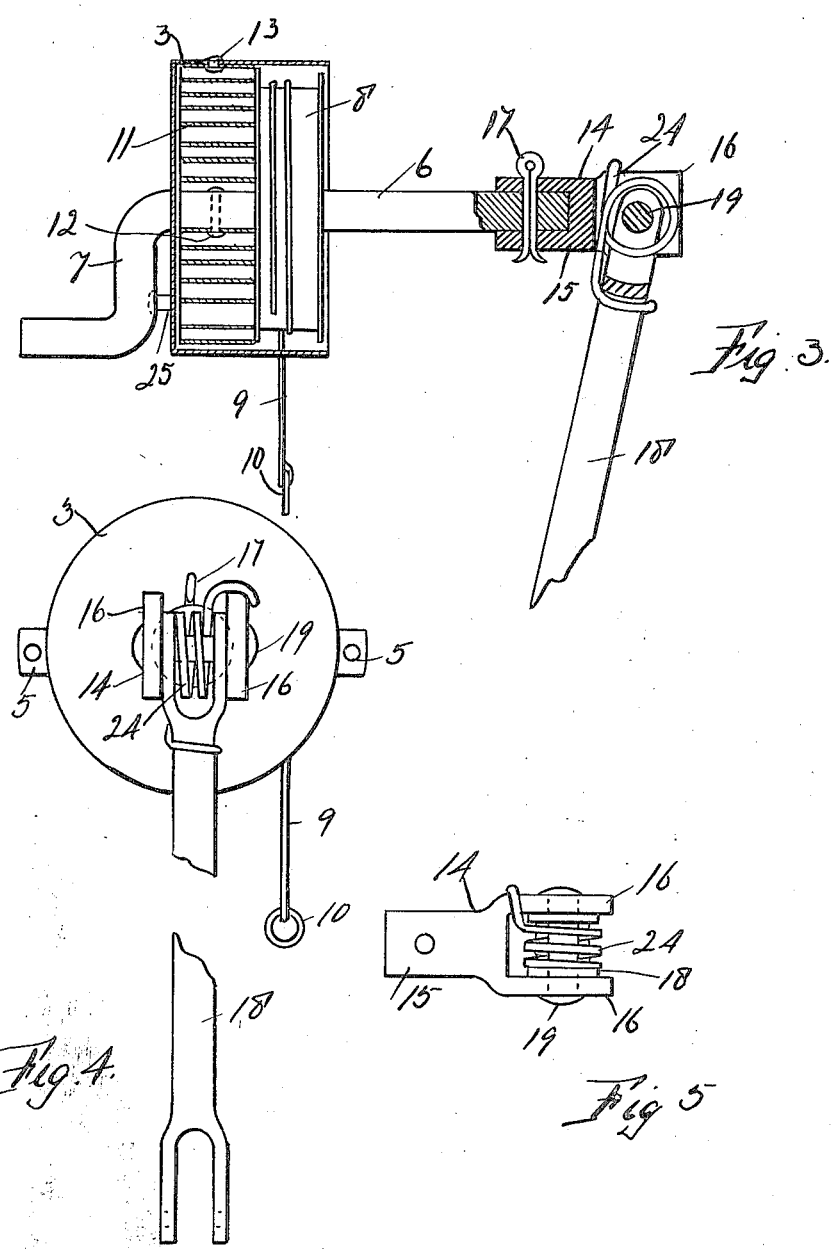

Patented Apr. 17, 1923.

1,451,698

UNITED STATES PATENT OFFICE.

EDWARD KELBER, OF HARRIMAN, PENNSYLVANIA.

WINDSHIELD CLEANER.

Application filed March 2, 1922. Serial No. 540,398.

*To all whom it may concern:*

Be it known that I, EDWARD KELBER, a citizen of the United States, residing at Harriman, in the county of Bucks and State of Pennsylvania, have invented new and useful Improvements in a Windshield Cleaner, of which the following is a specification.

My invention relates to new and useful improvements in a wind shield cleaner, which is particularly adapted to installation on wind shields of automobiles although the same may be used on street cars or the windows of buildings if desired.

Another object of the invention is to provide an exceedingly simple and effective device of this character which may be manually operated through the medium of either a crank handle or a pull cord and wound about a drum, the latter as well as the crank being connected with the shaft which supports the squeegee, said shaft being normally forced in one direction by means of a coil spring connected with the shaft and a suitable casing or housing.

A further object of the invention is to provide a unique combination of elements whereby the squeegee will always be firmly held against the glass to be cleaned, said combination of elements also compensating for the differences between the outer end of the shaft and the glass window due to different thicknesses of the window frame or the position of the glass in said frame.

A still further object of the invention is to provide in combination a housing provided with means for attachment to the window frame of a wind shield, a shaft passing through said housing, a barrel fixed to the shaft within the housing, a pull cord wound about said drum for revolving the shaft in one direction, a spring also located in the housing and coiled about the shaft with one end fixed thereto and the other end fixed to the housing to revolve the shaft in the opposite direction, a crank fixed to said shaft for also revolving said shaft, the said crank in conjunction with a pin upon the housing acting as a stop to limit the movement of the shaft in one direction, a forked connection on the outer end of said shaft, a spring actuated arm for normally forcing its outer end toward a window, and a squeegee pivoted intermediate its ends to the outer end of said arm.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a fragmentary inner face view of a wind shield window showing my invention applied thereto.

Fig. 2, is a fragmentary sectional view of the window with the cleaner illustrated in elevation.

Fig. 3, is a fragmentary sectional view of the wind shield cleaner illustrating the details of construction.

Fig. 4, is an outer end view or front elevation of the cleaner with the squeegee removed and a portion of the arm broken away.

Fig. 5, is an enlarged side elevation of the connection between the shaft and squeegee supporting arm.

In carrying out my invention as herein embodied, 1 represents the window frame of a wind shield having a glass window 2 mounted therein in any suitable and well known manner. To the inside surface of any desired part of the window frame 1, preferably the upper rail thereof, is secured the casing or housing 3 by means of fastening devices 4, such as screws, passing through the lugs 5 on said casing or housing. A shaft 6 passes through the casing and through the window frame, a hole being bored for this purpose.

On the inner end of the shaft is fixed or formed a crank 7 for revolving said shaft and on a portion of the shaft within the housing is also fixed a drum 8 about which is wound a pull cord 9 the free end of said cord passing through a hole in the casing so as to be readily gripped by the operator and the extreme end of said cord may have a ring 10 or other device tied thereto. This pull cord when pulled upon will revolve the shaft the same as the crank and in order to return the shaft to its normal position or normally revolve it in the direction opposite to which it is turned by the crank or pull cord I provide a flat helical spring 11 coiled about a portion of the shaft 6 within the casing or housing and having one end fixed to said shaft as at 12 and the other end fixed to the casing or housing as at 13.

On the outer end of the shaft 6 is mounted a connector 14 consisting of a socket 15 and a pair of spaced ears 16 the socket portion registering with the outer end of the shaft 6 and the connector being held in place on said shaft by suitable fastening means 17 such as a cotter pin or its equivalent, said cotter pin passing through the socket and the outer end of the shaft, as plainly shown in Fig. 3. Between the spaced ears 16 is mounted the squeegee supporting arm 18 having bifurcated ends and said arm is pivoted or journalled upon a bolt 19 or its equivalent passing through the spaced ears 16 and one of the bifurcated ends of said arm.

In the bifurcated outer end of the arm 18 is pivoted a squeegee 20 by means of a rivet 21 or its equivalent said squeegee being here shown as comprising a metallic holder 22 and a wiper 23 of suitable compressible material such as rubber or a composition thereof. The squeegee is adapted to contact with the glass window 2 and be moved across the same by the rotation of the shaft 6 and in order to hold said squeegee in contact with the glass window I provide a spring 24 which is coiled about the bolt 19 within the bifurcated end of the arm 18 with one end of said spring partially bent about or attached to the connector 14 as the stationary element and the other end of said spring coiled about or attached to the arm 18 as the movable element and said squeegee will be forced against the glass window regardless of the distance between said window and the point of connection of the arm 18 with the connector 14, within certain limits, so that said squeegee will be automatically adjusted to the glass window.

As it is desirable to limit the movement of the squeegee in its return to its normal position I provide a stop pin 25 or its equivalent such as a lug on the casing or housing 3 with which the crank 7 will contact as soon as the squeegee has been returned to its position at rest.

The operation of the device is as follows:—

Should the surface of the glass window 2 become coated with moisture, rain or snow so that the visibility is impaired it is only necessary to pull upon the cord 9 causing it to partially unwind from the drum 8 which action will revolve said drum and with it the shaft 6 thereby swinging the arm in the arc of a circle to draw the squeegee across the glass window and wipe the same clean and as the squeegee is firmly but resiliently held against the glass window 2 by means of the spring 24 all of the moisture on that portion of the glass will undoubtedly be removed. When the shaft 6 is revolved the helical spring 11 connected therewith will be partially wound up so that as soon as the pull cord 9 is relieved of the force of power pulling upon the same the spring 11 will return the parts to their normal positions where they will be stopped and maintained by the contact of the crank 7 with the stop pin 25. Should the pull cord 9 accidentally become disengaged from its drum or broken the device may be actuated by the crank 7 so that said crank is used both as an operating means and as a stop in conjunction with the stop pin.

Of course I do not wish to be limited to the exact details of construction as herein shown as these may be varied within the limits of the appended claims without departing from the spirit of my invention.

Having thus fully described my invention, what I claim as new and useful is:—

1. A wind shield cleaner comprising in combination, a casing or housing, lugs formed therewith through which fastening devices are adapted to pass for attaching said casing to a window frame, a shaft passing through said housing and through the window frame to which said housing is secured, a helical spring coiled about a portion of the shaft within the housing having one end fixed to said shaft and the other end fixed to the housing, a drum fixed to a portion of the shaft within the housing, a pull cord wound about said drum with one end passing through the housing whereby it may be pulled upon by an operator, a stop on the exterior of said housing, a crank carried by the inner end of the shaft for rotating said shaft and coacting with the above mentioned stop to limit the rotation of the shaft in one direction, a connector attached to the outer end of the shaft, said connector having a pair of spaced ears, an arm having bifurcated ends, one of the bifurcated ends of said arm being located between the spaced ears of the connector, means passing through the spaced ears and the arm for journalling the same to the connector, a spring coiled about said means for normally holding the outer end of said arm rearwardly, and a pivoted squeegee within the outer bifurcated end of said arm.

2. In a wind shield cleaner the combination of a housing secured to the inner face of a window frame, a shaft journalled in said housing and adapted to pass through the window frame, a spring within the housing and connected to the shaft and said housing for normally holding said shaft in one position, means to rotate said shaft against the action of said spring, a squeegee supporting arm pivoted to the outer end of the shaft, a squeegee pivoted to the outer end of the arm, and means for normally forcing said arm in that direction which will hold the squeegee in contact with the glass window.

In testimony whereof, I have hereunto affixed my signature.

EDWARD KELBER.